United States Patent
Chung et al.

(10) Patent No.: US 7,529,880 B2
(45) Date of Patent: May 5, 2009

(54) ADDRESS MAPPING TABLE AND METHOD OF STORING MAPPING DATA IN THE SAME

(75) Inventors: Hyun-Mo Chung, Yongin-si (KR); Hye-Young Kim, Seoul (KR); Chan-Ik Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 301 days.

(21) Appl. No.: 11/319,280

(22) Filed: Dec. 29, 2005

(65) Prior Publication Data

US 2006/0212674 A1 Sep. 21, 2006

(30) Foreign Application Priority Data

Feb. 7, 2005 (KR) .................. 10-2005-0011292

(51) Int. Cl.
*G06F 12/00* (2006.01)
(52) U.S. Cl. .................. 711/103; 711/209; 711/221
(58) Field of Classification Search .......... 711/103, 711/209, 221
See application file for complete search history.

(56) References Cited

U.S. PATENT DOCUMENTS

| | | | |
|---|---|---|---|
| 5,946,714 A | 8/1999 | Miyauchi | |
| 2004/0085849 A1* | 5/2004 | Myoung et al. | 365/232 |
| 2004/0186946 A1* | 9/2004 | Lee | 711/103 |
| 2004/0193786 A1 | 9/2004 | Inagaki et al. | |
| 2004/0210706 A1* | 10/2004 | In et al. | 711/103 |

FOREIGN PATENT DOCUMENTS

| | | |
|---|---|---|
| JP | 09-185551 | 7/1997 |
| JP | 09-282111 | 10/1997 |
| JP | 2000-122909 | 4/2000 |
| JP | 2004-086295 | 3/2004 |
| JP | 2004-086300 | 3/2004 |

\* cited by examiner

*Primary Examiner*—Reba I Elmore
(74) *Attorney, Agent, or Firm*—Volentine & Whitt, P.L.L.C.

(57) ABSTRACT

A run level address mapping table and related method provides for storing address mapping data, which maps logical addresses to physical addresses in a flash memory using a flash translation layer. A first value is stored in the address mapping table, indicating an initial location for a run within a memory block, the run having at least two consecutive physical addresses. A second value is stored in the address mapping table, indicating a total size for the run.

21 Claims, 7 Drawing Sheets

| LPN | Sector0 | Sector1 | Sector2 | Sector3 |
|---|---|---|---|---|
| 0 | 0 | 1 | 2 | 3 |
| 1 | 4 | 5 | 6 | 7 |
| ⋮ | ⋮ | ⋮ | ⋮ | ⋮ |

RUN0 spans rows 0–1. Right side: Page (single row), Block (all rows).

Fig. 1
(PRIOR ART)

| LPN | PPN |
|---|---|
| 0 | 0 |
| 1 | 1 |
| 2 | 2 |
| ⋮ | ⋮ |

Page = row; Block = full table

Fig. 2
(PRIOR ART)

| LPN | PPN |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 20 |
| 9 | 21 |
| 10 | 22 |
| 11 | 23 |
| 12 | 15 |
| ⋮ | ⋮ |

RUN0: LPN 0–7; RUN1: LPN 8–11; Block encompasses all rows.

Fig. 3

| INITIAL LPN | INITIAL PPN | NUMBER OF CONSECUTIVE PPN |
|---|---|---|
| 0 | 0 | 8 |
| 8 | 20 | 4 |
| ⋮ | ⋮ | ⋮ |

RUN0 → row 1
RUN1 → row 2
Block

Fig. 4

| INITIAL PPN | NUMBER OF CONSECUTIVE PPN |
|---|---|
| 0 | 8 |
| 20 | 4 |
| ⋮ | ⋮ |

RUN0 → row 1
RUN1 → row 2
Block

Fig. 5A

| LPN | Sector0 | Sector1 | Sector2 | Sector3 |
|-----|---------|---------|---------|---------|
| 0   | 0       | 1       | 2       | 3       |
| 1   | 4       | 5       | 6       | 7       |
| ⋮   | ⋮       | ⋮       | ⋮       | ⋮       |

RUN0 spans LPN 0–1; rows form a Page; full table is a Block.

Fig. 5B

| INITIAL PPN | NUMBER OF CONSECUTIVE PPN |
|-------------|---------------------------|
| 0           | 2                         |
| ⋮           | ⋮                         |

RUN0

Fig. 6A

| LPN | Sector0 | Sector1 | Sector2 | Sector3 |
|---|---|---|---|---|
| 0 | Copy back8 | Copy back9 | 10 | 11 |
| 1 | 12 | 13 | 14 | 15 |
| 2 | 16 | | | |
| 3 | | | | |
| ⋮ | ⋮ | ⋮ | ⋮ | ⋮ |

Fig. 6B

| INITIAL PPN | NUMBER OF CONSECUTIVE PPN |
|---|---|
| 8 | 3 |
| ⋮ | ⋮ |

Fig. 7A

| LPN | Sector0 | Sector1 | Sector2 | Sector3 |
|-----|---------|---------|---------|---------|
| 0   | 8       | 9       | 10      | 11      |
| 1   | 12      | 13      | 14      | 15      |
| 2   | 16      | 17      | 18      | 19      |
| 3   | 20      |         |         |         |
| ⋮   | ⋮       | ⋮       | ⋮       | ⋮       |

RUN1″, RUN1′, RUN2, Page, Block

Fig. 7B

| INITIAL PPN | NUMBER OF CONSECUTIVE PPN |
|-------------|---------------------------|
| 8           | 3                         |
| 20          | 1                         |
| ⋮           | ⋮                         |

RUN1′, RUN2

→

| INITIAL PPN | NUMBER OF CONSECUTIVE PPN |
|-------------|---------------------------|
| 8           | 4                         |
| ⋮           | ⋮                         |

RUN1″

Fig. 8A

| LPN | Sector0 | Sector1 | Sector2 | Sector3 |
|---|---|---|---|---|
| 0 | 8 | 9 | 10 | 11 |
| 1 | 12 | 13 | 14 | 15 |
| 2 | 16 | 17 | 18 | 19 |
| 3 | 20 | Copy back21 | Copy back22 | Copy back23 |
| 4 | 0 | 1 | 2 | 3 |
| 5 | 4 | | | |
| ⋮ | ⋮ | | | |

RUN1″: LPN 0–3
RUN2: LPN 4–5
Page / Block

Fig. 8B

| | LPN | PPN |
|---|---|---|
| RUN1″ | 8 | 4 |
| RUN2 | 0 | 2 |
| | ⋮ | ⋮ |

| | INITIAL PPN | NUMBER OF CONSECUTIVE PPN | |
|---|---|---|---|
| | 3 | 6 | RUN3 |
| | 4 | 2 | RUN3' |
| | ⋮ | ⋮ | |

WRITE ↓  SEARCH ↑

ADDRESS MAPPING TABLE AND METHOD OF STORING MAPPING DATA IN THE SAME

BACKGROUND OF THE INVENTION

1. Field of the Invention

Embodiments of the invention relate generally to memory devices and memory systems. More particularly, embodiments of the invention relate to devices and methods adapted to efficiently manage nonvolatile memory, such as a flash memory.

2. Description of the Related Art

A nonvolatile memory maintains data previously written to its constituent memory cell even when the memory does not receive power. Flash memory is one specific type of nonvolatile memory which is widely used in computers, memory cards, etc. Flash memory is a preferred memory choice in many applications because its memory cells may be electrically erased in bulk manner. More recently, flash memory has found increasing use on such portable information devices as cell phones, PDAs, and digital cameras. More generally, flash memory is being used with increasing frequency as a replacement for hard disk and other types of data storage.

Contemporary flash memory is classified into NOR type and NAND type according to a connection state between respective cells and bit lines. NOR flash memory has a high read speed and a low write speed and is thus used mainly for code memory. In contrast, NAND flash memory has a high write speed and a low price per unit area and is thus used mainly for large-capacity storage. However, as compared to other types of memory, flash memory provides relatively high speed read operations at a relatively low unit cost. Flash memory is characterized by the execution of an erase operation before a write operation, wherein the unit of data being written is larger than the of data erased. This characteristic makes it difficult to use flash memory as a main memory. It also makes it difficult for flash memory to use general hard disk filing systems even in applications where flash memory is used as an auxiliary memory. Accordingly, a flash translation layer (FTL) is commonly used between the file system and flash memory in order to make the unique programming characteristics inherent in flash memory transparent to the host device.

The FTL serves to map a logical address generated by the file system into a physical address of the flash memory, at which the erase operation is performed, during a flash memory write operation.

Examples of conventional address mapping methods are disclosed in U.S. Pat. Nos. 5,404,485; 5,937,425; and 6,381,176, the subject matter of which is hereby incorporated by reference. The FTL typically uses an address mapping table to perform a rapid address mapping operation. In general, the address mapping table is formed (i.e., created and/or stored) in relatively expensive static random access memory (SRAM).

Using a FTL address mapping function, a host device may operationally recognize flash memory as substituted for a hard disk or SRAM, and may thus access the flash memory in the same manner as the hard disk. The FTL may be embodied in hardware separate and independent to the host device, or it may be embodied in a device driver internal to the host device.

The FLT address mapping function may be broadly classified as page-level address mapping and block-level address mapping according to its basic address mapping unit, wherein the page is a unit of write data and the block is a unit erase data. Page-level address mapping provides excellent performance because it converts an address with greater accuracy, but it is expensive to implement because it requires a large-sized address mapping table. Block-level address mapping requires a relatively smaller sized address mapping table because only roughly converts an address, but it is expensive to manage because it must erase and update a whole data block even when only a single page in the block requires update. In addition, block-level address mapping may undesirably break data consistency when a fault occurs during its operation.

To overcome these problems, a log-block scheme that stores data logarithmically in a manner similar to that of log-structured file systems (LFS) has recently been proposed. The log-block scheme combines aspects of page-level address mapping and block-level address mapping. The log-block scheme processes relatively large quantities of Input/Output (I/O) data on a block basis and processes relatively small quantities of I/O data on a page basis. However, an address mapping method used within the log-block scheme requires three (3) address mapping tables, such as a block mapping table, a log-block mapping table, and a log mapping table. Thus, the log-block scheme generally involves a complex process of controlling I/O operations using such tables.

As described above, the conventional FTL uses a variety of the conventional address mapping methods. However, use of these conventional address mapping methods fails to prevent an increase in the size of the address mapping table tending to result from increased data storage capacities for emerging host devices. Accordingly, a requirement exists for an address mapping table that more efficiently manages address mapping information related to a flash memory. Such an address mapping table should occupy a relatively small memory even when the memory capacity of the incorporating host device expands.

SUMMARY OF THE INVENTION

Embodiments of the invention are directed to a run level address mapping table and a method of forming a run level address mapping table that substantially obviates one or more limitations and/or disadvantages associated with conventional address mapping tables. For example, embodiments of the invention provide a method of forming an address mapping table enabling efficient mapping information management using only a small memory capacity.

One embodiment of the invention provides an address mapping table adapted for use with a flash memory. The address mapping table includes address mapping data mapping logical addresses to physical addresses in the flash memory using a flash translation layers. The address mapping data includes a first value indicating an initial location in flash memory for a run having at least two consecutive physical addresses, and a second value indicating total size for the run.

Another embodiment of the invention provides a method of constructing an address mapping table adapted to store address mapping data mapping logical addresses to physical addresses in a flash memory using a flash translation layer. The method includes storing the address mapping data in the address mapping table. Storing the address mapping data includes storing a first value indicating an initial location for a run, which has at least two consecutive physical addresses, and storing a second value indicating a total size for the run.

Yet another embodiment of the invention provides an address mapping table adapted for use with a flash memory using a flash translation layer, and storing address mapping data related to a run. The address mapping data includes an initial physical page value indicating an initial location for the run, and a consecutive physical page value indicating a total size for the run.

Figure 6A:
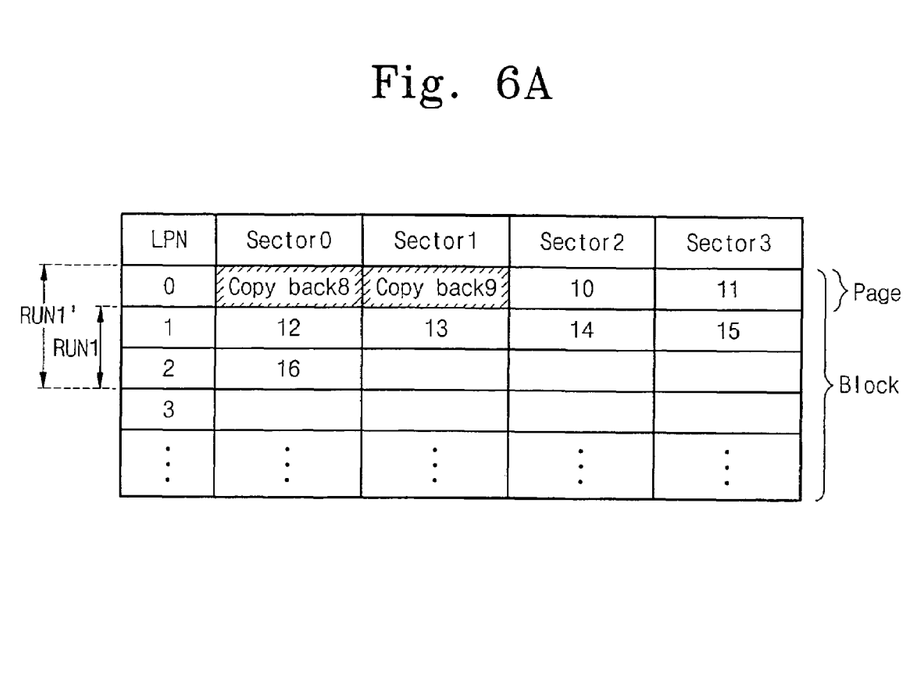
Figure 6B:
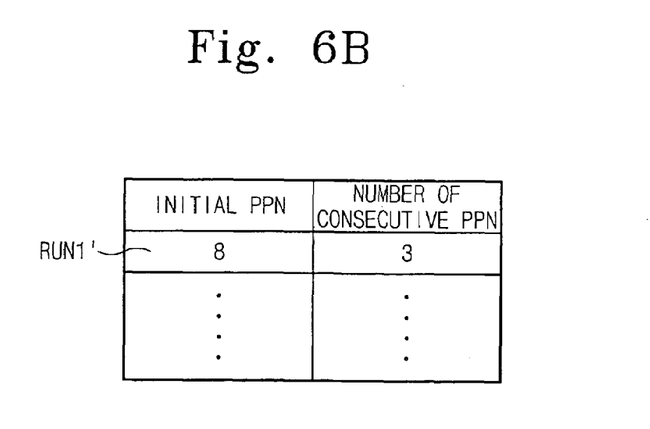

Referring to FIG. 6A, Sectors 0 to 3 corresponding to respective physical sector numbers are determined through a modulo operation (e.g., sector number=physical sector number mod 4). For example, physical sector numbers 10 and 11 are stored in Sectors 2 and 3, respectively. According to one exemplary method, the first two Sectors 0 and 1 corresponding to an LPN0 may remain empty. In this case, since Sector 0 corresponding to an initial physical address of the corresponding page is empty, there is a possibility that the resulting offset value will be inaccurate. Accordingly, in one embodiment of the invention a copy-back operation is performed on the possible empty sector so as to accurately determine the offset value of the run level address mapping table. The copy-back operation consists of copying data stored in another physical sector into the corresponding empty sector. The copy-back operation makes it possible to accurately determine the offset value and to compactly and easily store data forming the run level address mapping table. The sector level address mapping table shown in FIG. 6A can be reconstructed into the run level address mapping table illustrate in FIG. 6B.

Figure 7A:
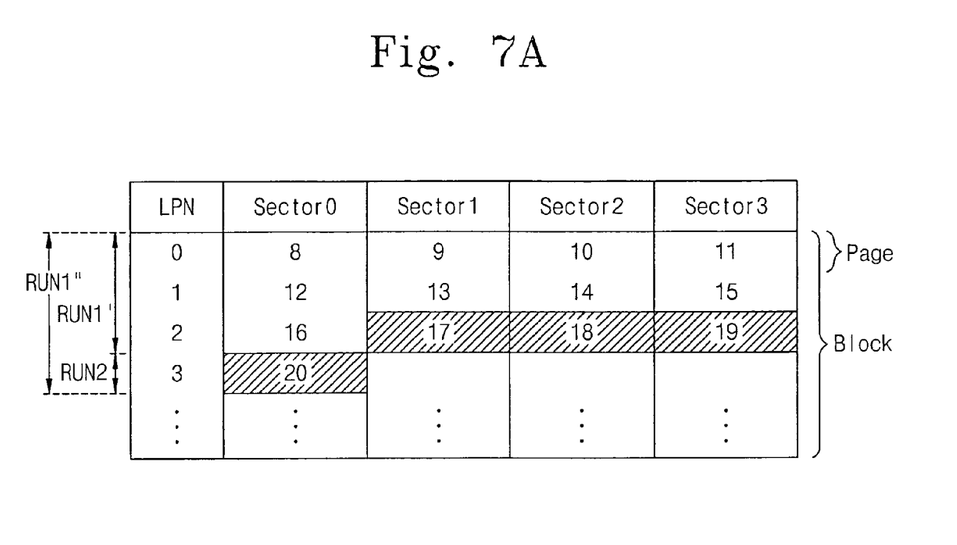
Figure 7B:
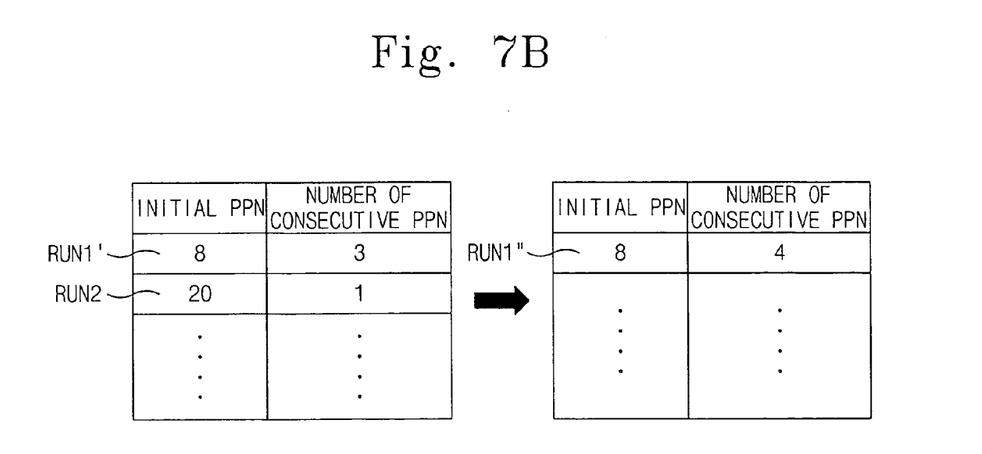

FIG. 7A illustrates a case where an additional page having consecutive physical sector values (see, e.g., the hatched region in FIG. 7) is contiguously written in the sector level address mapping table illustrated in FIG. 6A. In this case, only the consecutive PPN value written in the previous run level address mapping table is updated without adding an additional entry to the previous table entry. Consequently, the memory capacity required to store and manage the run level address mapping table is greatly reduced. Also, since the contiguous pages are managed using one integrated entry, the data management for the address mapping table is more easily performed.

Figure 8A:
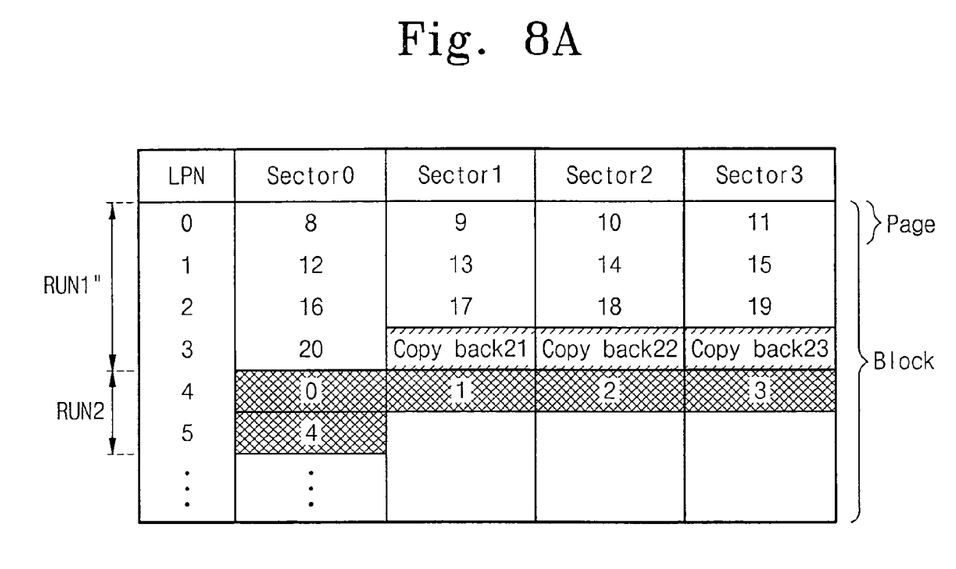
Figure 8B:
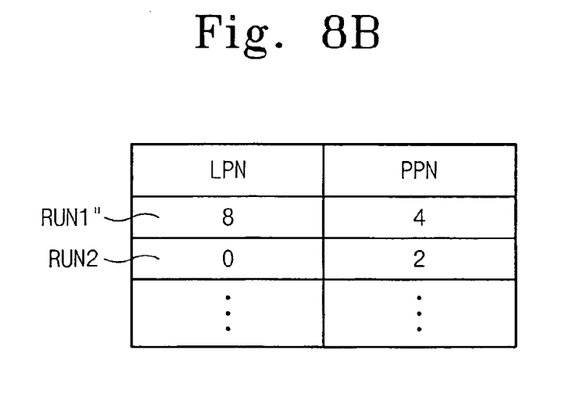

FIG. 8A illustrates a case where an additional page having consecutive physical sector values (see, e.g., the hatched region in FIG. 8) is discontinuously written in the sector level address mapping table illustrated in FIG. 6A. In this case, address mapping data related to a run, wherein the address mapping data comprises; an initial physical page value indicating a initial location for the run, and a consecutive physical page value indicating a total size for the run.

BRIEF DESCRIPTION OF THE DRAWINGS

Several embodiments of the invention will be described in relation to the accompanying drawings, in which:

FIGS. (FIGS.) 1 and 2 are diagrams illustrating general address mapping tables;

FIGS. 5A through 8B are diagrams illustrating a process of forming a run through a flash memory write operation and a process of constructing a run level address mapping table with respect to the formed run when a page is composed of a plurality of sectors.

DESCRIPTION OF EXEMPLARY EMBODIMENTS

Several embodiments of the invention will now be described as teaching examples with reference to the accompanying drawings. However, the invention is not limited to only the exemplary embodiments. Rather, the scope of the invention is defined by the claims that follow.

One or more embodiments of the invention provide a run level address mapping table and related method of construction. One exemplary method, constructs the address mapping table on a run basis. Here, the term "run" denotes a set of consecutive memory pages having consecutive logical and/or physical addresses. The run level address mapping table stores an initial physical page number for each run and the number of the consecutive physical pages. By doing so, the run level address mapping table makes it possible to detect all of the logical and physical page numbers contained in a run using a simple arithmetic operation. Accordingly, it is possible to efficiently manage the address mapping information using only a relatively small quantity of memory.

Figure 1:
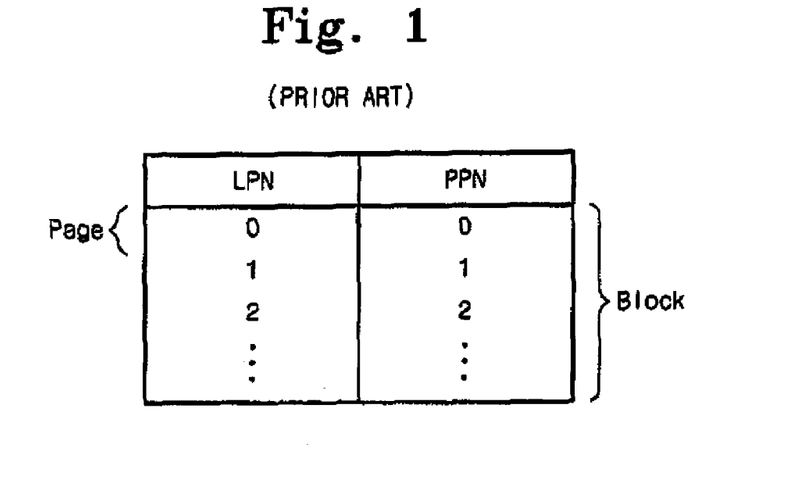
Figure 2:
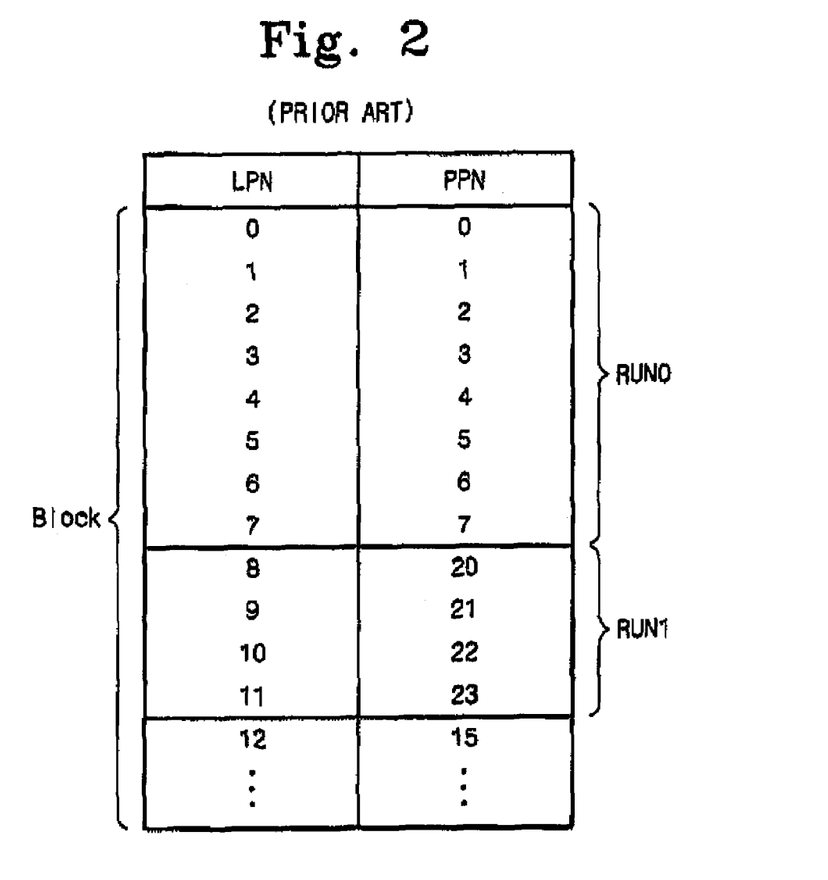

FIGS. 1 and 2 are diagrams illustrating construction of a general address mapping table in which address mapping data are stored on a page basis.

A flash memory is divided into a plurality of memory blocks, and each memory block includes a plurality of pages (or sectors). A virtual page number defined by a user is called a "logical page number (LPN)", and a number allocated to a divided page is called a "physical page number (PPN)". The LPN may be one-to-one mapped to a corresponding PPN through the address mapping table. For example, as illustrated in FIG. 1, data corresponding to a first logical page number LPN0 is stored at a first physical page number PPN0 and data corresponding to a second logical page number LPN1 is stored at a second physical page number PPN1.

As can be seen from an address mapping table in FIG. 2, LPNs and PPNs may be arranged in a substantially consecutive manner. For example, data corresponding to first through eighth logical page numbers LPN0 to LPN7 are sequentially stored at first through eighth physical page numbers PPN0 to PPN7. However, data corresponding to ninth through twelfth logical page numbers LPN8 to LPN11 may be sequentially stored at twenty through twenty-third physical page numbers PPN20 to PPN23. This set of consecutive pages having consecutive logical and/or physical addresses is called a "consecutive page group" or a "run". In certain embodiments of the invention, the address mapping table is constructed on a run by run basis according to the characteristics (e.g., the construction) of the data (i.e., the logical and/or physical addresses as sequentially arranged). Hereafter, this type of address mapping table will be referred to as a "run level address mapping table.

Figure 3:
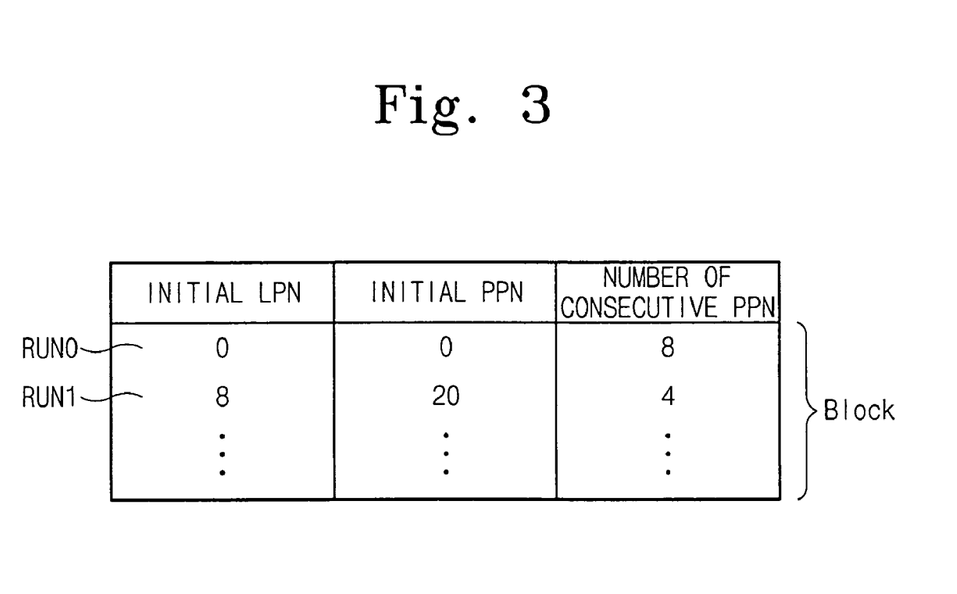
FIG. 3 is a diagram illustrating a run level address mapping table according to an embodiment of the present invention.

FIG. 3 is a diagram illustrating construction of a run level address mapping table according to one embodiment of the invention. The run level address mapping table shown in FIG. 3 is obtained by reconstructing the address mapping table illustrated in FIG. 2. That is, a first run (RUN0) composed of eight entries in FIG. 2 is represented by a single entry in FIG. 3. A second run (RUN1) consisting of four entries in FIG. 2 is also represented by a single entry in FIG. 3. Accordingly, the memory size required to store the information contained in the run level address mapping table is substantially reduced.

Referring to FIG. 3, the run level address mapping table includes three values, that is, an initial LPN, an initial PPN, and the number of consecutive PPNs. The initial logical page number for each run is stored as the initial LPN value in FIG. 3, and the initial physical page number for each run is stored as the initial PPN value in FIG. 3. In addition, the number of pages (or similar size indication) included in each run is stored as the consecutive PPN number value in FIG. 3. For example, values of "0", "0", and "8" are respectively stored for the initial LPN value, the initial PPN value, and the consecutive PPN number value in relation to the first run (RUN0), because the first run (RUN0) starts at LPN "0", to which a PPN "0" corresponds, and includes a total of eight consecutive PPNs (i.e., consecutive PPN numbers 0 through 7).

By way of comparison, values "8", "20", and "4" are respectively stored for the initial LPN value, the initial PPN value, and the consecutive PPN number value for the second run (RUN1), because the second run RUN1 starts at LPN "8", to which a PPN "20" corresponds, and includes a total of four consecutive PPNs (i.e., consecutive PPN number 20 through 23). That is, even though the run level address mapping table does not store individual data values or indications for each and every page, all of the constituent LPNs and the PPNs for a given run may be found using a simple arithmetic or logical relationship and/or operation based on the initial LPN value, the initial PPN value, and the consecutive PPN value for each run.

For example, an initial LPN value may be determined using a simple arithmetic operation such as, [Initial PPN value+ (PPN incremented by 1)×(the consecutive PPN value)]. A value for each respective PPN may be determined by incrementing by 1 from the initial PPN value using the consecutive PPN value for each run. The predetermined logical/arithmetic operation may be performed using, for example, a flash translation layer (FTL), an FTL operation control circuit, and/or a central processing unit (CPU).

Figure 4:
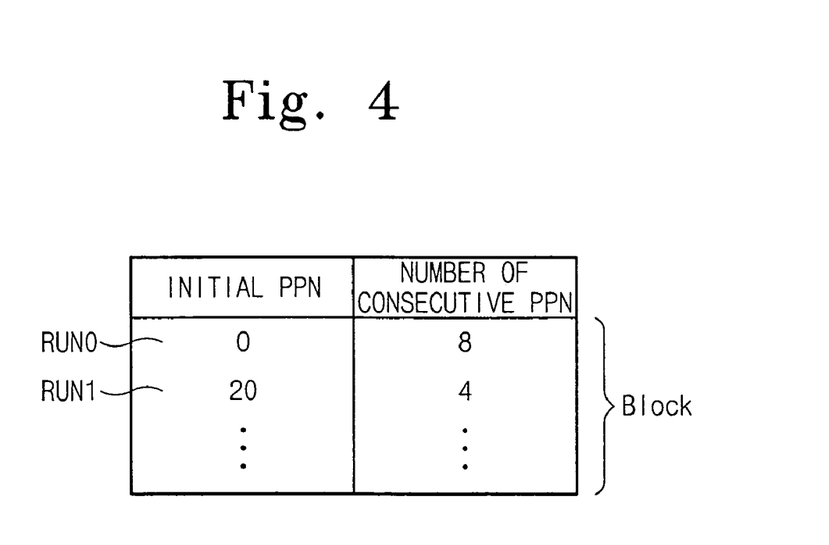
FIG. 4 is a diagram illustrating a run level address mapping table according to another embodiment of the present invention.

FIG. 4 is a diagram illustrating a run level address mapping table according to another embodiment of the invention. The run level address mapping table in FIG. 4 is a simplified form of the address mapping table illustrated in FIG. 3.

Referring to FIG. 4, the run level address mapping table only stores an initial PPN value and a consecutive PPN value for each run without storing an initial LPN value. The corresponding LPN values are virtually managed by the host device and may be arranged sequentially. Accordingly, although an initial LPN value is not stored in the run level address mapping table, all of the LPN values and PPN values for each run may be found using a simple arithmetic/logical operation based upon the initial PPN value, and the consecutive PPN value for each run. Consequently, the run level address mapping table is further simplified. In this case, the initial PPN value serves as an initial location (that is, an initial address value) for managing the run level address mapping table, and the consecutive PPN value serves as an offset value for managing the table. This approach to managing the run level address mapping table may also be performed using an FTL, an FTL operation control circuit, and/or a CPU.

Up to now, reference has been made to the construction of the run level address mapping table where one page is composed of one sector. In general, a page has the same size as a sector, for example, 512 bytes of data. However, it should be apparent to those skilled in the art that one page may be composed of a plurality of sectors. Therefore, reference will now be made to the construction of a run level address mapping table where one page is composed of a plurality of sectors, using four sectors as a convenient but entirely arbitrary example).

FIGS. 5A through 8B are diagrams illustrating a process of forming a run through a flash memory write operation and a process of constructing a run level address mapping table with respect to said run, assuming each page comprises a plurality of sectors (e.g. 4). FIGS. 5A, 6A, 7A, and 8A illustrate in some additional detail a plurality of sectors included in each page. FIGS. 5B, 6B, 7B, and 8B illustrate the construction of a run level address mapping table for the page construction illustrated in FIGS. 5A, 6A, 7A, and 8A.

Figure 5A:
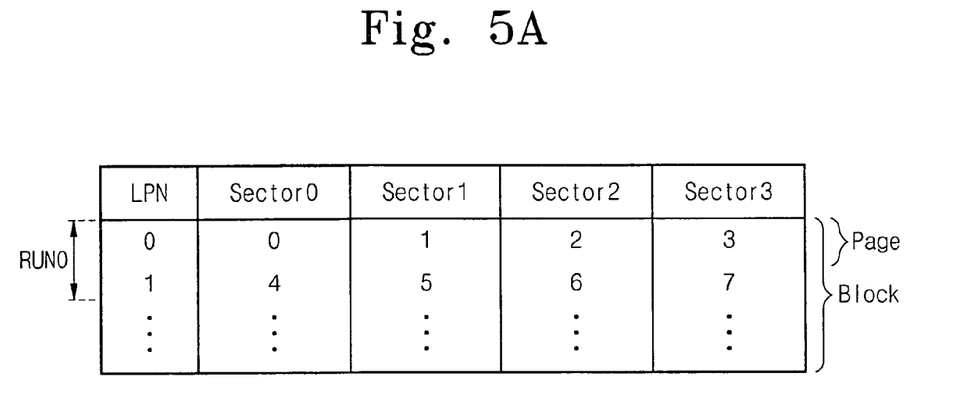
Figure 5B:
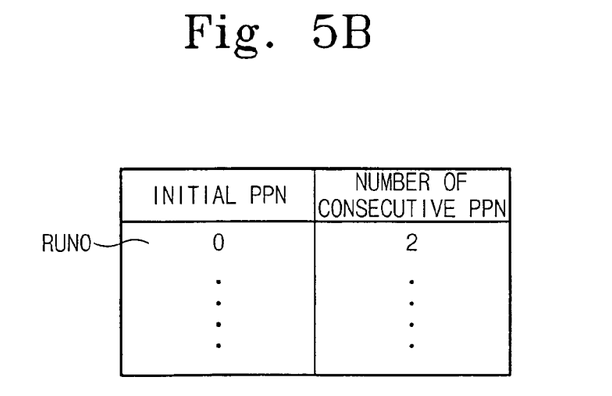

Referring to FIG. 5A, four physical sector values correspond to one LPN. For example, four physical sector values (e.g., Sectors 0 to 3), respectively 0, 1, 2, and 3 correspond to an LPN0, and four physical sector values 4, 5, 6, and 7 correspond to an LPN1. The eight physical sectors corresponding to the LPN0 and the LPN1 constitute the first run (RUN0). FIG. 5B illustrates the construction of a run level address mapping table form the page structure illustrated in FIG. 5A.

Referring to FIG. 5B, the run level address mapping table may indicate RUN0 with a single entry. In this case, the run level address mapping table stores only an initial PPN value for RUN0 (e.g., the first one of the eight consecutive PPNs) and a consecutive page value. Accordingly, although one page is composed of a plurality of sectors, the construction of a corresponding run level address mapping an additional entry is added to the previous entry and a copy-back operation is performed on the empty sectors of the previous page. Consequently, an offset value of the run level address mapping table can be accurately determined and data constituting the mapping table can be compactly stored. Also, the data management for the mapping table is more easily performed.

Figure 9A:
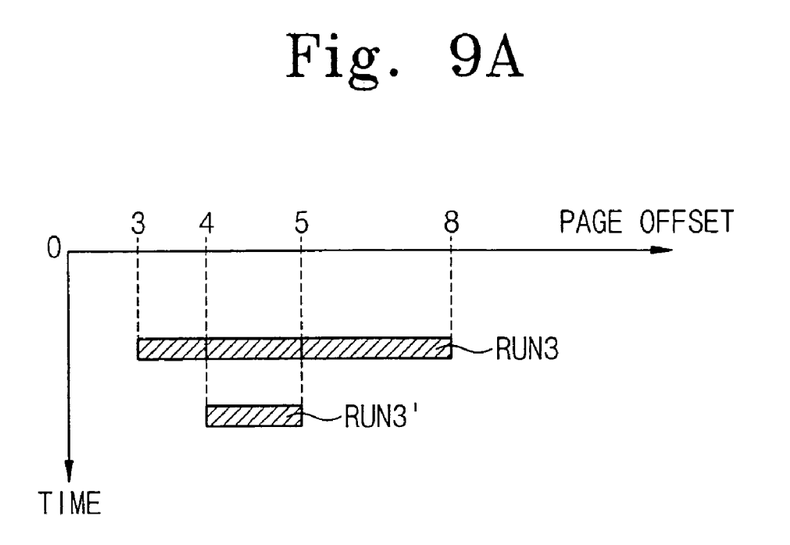
FIGS. 9A through 9B are diagrams illustrating a process of recognizing a run through a flash memory read operation and the construction of a corresponding run level address mapping table when a page is composed of a plurality of sectors.
Figure 9B:
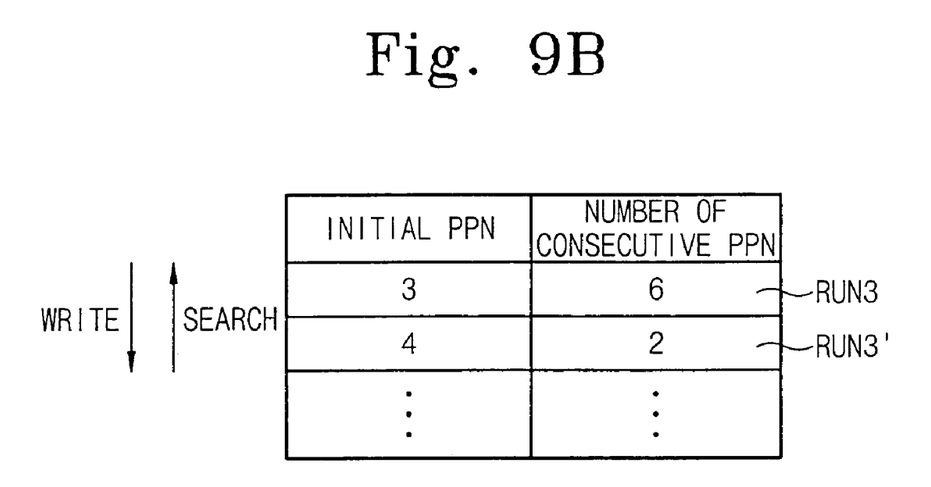

FIGS. 9A through 9B are diagrams illustrating a process of recognizing a run derived during a flash memory read operation and the construction of a corresponding run level address mapping table when a page is composed of a plurality of sectors.

Referring to FIG. 9A, a third run (RUN3) occurring at a first point in time may be changed into a modified third run (RUN3') occurring at a second point in time point. For example, at the first point in time, an initial physical page number for the third run (RUN3) is assumed to be 3 and the number of consecutive page numbers is 6. Thereafter, at the second point in time, through a read/write operation, an initial physical page number for the modified third run (RUN3') may change to 4 and the number of consecutive page numbers may change to 2.

In this case, entries are sequentially written in the run level address mapping table according to their sequence in time without changing the corresponding RUN information at each point in time. On the contrary, written data may be searched and read from the run level address mapping table according to the order in which it was written. For example, when the information from the modified third run (RUN3'), as stored at the second point in time overlaps the third run (RUN3) information stored at the first point in time, it is determined that the modified third run (RUN3') information is valid.

The memory capacity (e.g., allocated quantity of memory) required for the construction of the run level address mapping table according to one or more embodiments of the invention will now be compared with the memory capacity required for the construction of a conventional address mapping table. Specifically, the memory capacity for the inventive run level address mapping table will be compared with the memory capacity for the conventional log-block address mapping table. The comparison will be made on the assumption that a 4-way interleaving scheme, e.g., 64×4=256 page/super block, is used and the number of logs used is 7.

For example, the log-block address mapping table requires a page mapping entry of 512 byte/super block (or 2 byte/page×256 page/super block), and a sector (or page) bitmap entry of 128 byte/super block (or 1 bit/sector×1024 sector/ super block). In this case, the conventional log-block address mapping table requires a total memory capacity of 4480 byte (or (512+128) byte/super block×7 super block). Here, the super block is each interleaving block.

In contrast, the inventive run level mapping table requires only a total memory capacity of 448 byte (or 4 byte/run×16 run/super block×7 super block) because it requires only a relatively small number of entries. As above, the inventive run level address mapping table only requires about 1/10 the memory capacity of the conventional address mapping table. That is, the inventive run level address mapping table requires a greatly reduced memory capacity. Accordingly, the mapping information may be more efficiently managed using only a small memory capacity.

Embodiments of the invention may be embodied as computer-readable code on a computer-readable recording medium. The term "computer-readable recording medium" means any data storage device or material adapted for storing data which may thereafter be read by a computer system. Examples of computer-readable recording medium include; read-only memory (ROM), random-access memory (RAM), CD-ROMs, magnetic tapes, floppy disks, optical data storage devices, and carrier waves (such as data transmission through the Internet). The computer-readable recording medium may be distributed (or distributable) over network-coupled computer systems so that the computer-readable code is stored and executed in a distributed fashion.

As described above, embodiments of the invention allow efficient management of an address mapping information for flash memory-based data using a relatively small memory capacity.

It will be apparent to those skilled in the art that various modifications and variations may be made in the foregoing exemplary embodiments. Thus, the scope of the invention is not limited to only foregoing examples, but extends to such modifications and variations and their equivalents. The scope of the invention is defined by the following claims.

What is claimed is:

1. An address mapping table adapted for use with a flash memory, the address mapping table comprising:
    address mapping data mapping logical addresses to physical addresses in the flash memory using a flash translation layer, wherein the address mapping data comprises:
        a first value indicating an initial location in the flash memory for a run, the run comprising at least consecutive physical addresses to which corresponding consecutive logical addresses are mapped; and
        a second value indicating total size for the run.

2. The address mapping table of claim 1, wherein the address mapping table stores the address mapping data on a run entry basis beginning at the initial location.

3. The address mapping table of claim 2, wherein the flash translation layer calculates a plurality of logical addresses and a plurality of physical addresses corresponding to the run on the basis of the initial location and the total size of the run.

4. The address mapping table of claim 1, wherein only the total size of the run is updated when a modified version of the run having consecutive physical addresses continuous with the physical addresses of the run is stored in the address mapping table.

5. The address mapping table of claim 1, wherein the logical addresses are logical page values in the flash memory.

6. The address mapping table of claim 1, wherein the physical addresses are physical page values in the flash memory.

7. The address mapping table of claim 6, wherein each physical page value corresponds to at least one or more physical sector values.

8. A method of storing address mapping data in an address mapping table, the address mapping data mapping logical addresses to physical addresses in a flash memory using a flash translation layer, the method comprising:
    storing a first value indicating an initial location for a run, the run comprising at least consecutive physical addresses to which corresponding consecutive logical addresses are mapped; and
    storing a second value indicating a total size for the run.

9. The method of claim 8, wherein the address mapping data associated with a the run is stored on a run entry basis.

10. The method of claim 8, further comprising:
    storing updated address mapping data in the address mapping table.

11. The method of claim 10, wherein storing the updated address mapping data comprises writing only a total size for an updated run in the address mapping table when the updated run has consecutive physical addresses continuous with the physical addresses of the stored run.

12. The method of claim 8, wherein the logical addresses are logical page values in the flash memory.

13. The method of claim 8, wherein the physical addresses are physical page values in the flash memory.

14. The method of claim 13, wherein each physical page value corresponds to at least one or more physical sector values.

15. The method of claim 14, the method further comprising:
    upon having one or more empty physical sectors within the one or more physical sector values, performing a copyback operation to the one or more empty physical sectors.

16. The method of claim 10, the method further comprising:
    upon a change in the initial location or total size for a run, reconstructing the address mapping data according to a time sequence.

17. An address mapping table adapted for use with a flash memory using a flash translation layer, and comprising a plurality of entries for storing address mapping data related to a run, wherein the address mapping data comprises:
    an initial physical page value indicating an initial location for the run; and
    a consecutive physical page value indicating a number of consecutive physical page values following the initial physical page value in the run.

18. The address mapping table of claim 17, wherein the address mapping data further comprises:
    an initial logical page value, wherein the initial logical page value is correlated by the flash translation layer to the initial physical page value of the run.

19. The address mapping table of claim 18, wherein the initial physical page value corresponds to at least one or more physical sector values.

20. An address mapping table adapted for use with a flash memory, the address mapping table comprising:
    address mapping data mapping logical addresses to physical addresses in the flash memory using a flash translation layer,
    wherein the address mapping data comprises:
        a first value indicating an initial location in the flash memory for a run comprising at least consecutive physical addresses; and
        a second value indicating total size for the run, wherein the total size for the run is determined by a number of the consecutive physical addresses mapped with consecutive logical addresses.

21. An address mapping table adapted for use with a flash memory, the address mapping table comprising:
    address mapping data of the address mapping table, wherein each of the address mapping data comprises:

a first value indicating an initial location in the flash memory for a run; and a second value indicating total size for the run, wherein each of the address mapping data is stored on a basis of the run, and the run comprises a set of consecutive memory pages having consecutive physical addresses and corresponding consecutive logical addresses.

* * * * *